(12) United States Patent
Barton et al.

(10) Patent No.: US 8,126,866 B1
(45) Date of Patent: Feb. 28, 2012

(54) IDENTIFICATION OF POSSIBLE SCUMWARE SITES BY A SEARCH ENGINE

(75) Inventors: Chris Barton, San Francisco, CA (US);
Shumeet Baluja, Santa Clara, CA (US);
Avichal Garg, Cincinnati, OH (US);
Eric L. Davis, San Jose, CA (US); Fritz Schneider, San Francisco, CA (US);
Niels Provos, Mountain View, CA (US)

(73) Assignee: Google Inc., Mountain View, CA (US)

( * ) Notice: Subject to any disclaimer, the term of this patent is extended or adjusted under 35 U.S.C. 154(b) by 335 days.

(21) Appl. No.: 11/239,683

(22) Filed: Sep. 30, 2005

(51) Int. Cl.
*G06F 17/30* (2006.01)
*G06F 7/00* (2006.01)

(52) U.S. Cl. ........ 707/706; 707/722; 707/736; 707/758; 726/22; 726/24; 715/205; 715/207

(58) Field of Classification Search .................. None
See application file for complete search history.

(56) References Cited

U.S. PATENT DOCUMENTS

| | | | | |
|---|---|---|---|---|
| 6,161,130 A * | 12/2000 | Horvitz et al. | ................ | 709/206 |
| 7,239,963 B2 * | 7/2007 | Suzuki | ......................... | 701/211 |
| 2004/0073810 A1 * | 4/2004 | Dettinger et al. | ............. | 713/201 |
| 2004/0088570 A1 * | 5/2004 | Roberts et al. | ................ | 713/201 |
| 2004/0148281 A1 * | 7/2004 | Bates et al. | ....................... | 707/3 |
| 2005/0210102 A1 * | 9/2005 | Johnson et al. | ................ | 709/204 |
| 2006/0004748 A1 * | 1/2006 | Ramarathnam et al. | .......... | 707/6 |
| 2006/0069982 A1 * | 3/2006 | Petriuc | ............................ | 715/500 |
| 2006/0095424 A1 * | 5/2006 | Petropoulos et al. | ............. | 707/3 |
| 2006/0101341 A1 * | 5/2006 | Kelly et al. | .................... | 715/738 |
| 2006/0136374 A1 * | 6/2006 | Shelest et al. | ..................... | 707/3 |
| 2006/0242138 A1 * | 10/2006 | Brill et al. | ......................... | 707/5 |
| 2006/0253458 A1 * | 11/2006 | Dixon et al. | ..................... | 707/10 |
| 2007/0174249 A1 * | 7/2007 | James | .............................. | 707/3 |
| 2008/0172382 A1 * | 7/2008 | Prettejohn | ........................ | 707/6 |
| 2008/0208858 A1 * | 8/2008 | Kim et al. | ......................... | 707/6 |

* cited by examiner

*Primary Examiner* — Alicia Lewis
(74) *Attorney, Agent, or Firm* — Harrity & Harrity, LLP (57) ABSTRACT

Users may be protected from scumware included on or associated with web sites indexed by a search engine. The search engine may, for instance take the presence of scumware into account when ranking or determining whether a document matches a search query or provide information with search results that indicates that a particular search result link may be associated with scumware. In one implementation, a search engine generates search results for a search query to obtain documents that are relevant to the search query. The search engine may then format the search results as a web page that includes visual indicators associated with those of the relevant documents that have been determined to be associated with scumware.

18 Claims, 10 Drawing Sheets

IDENTIFICATION OF POSSIBLE SCUMWARE SITES BY A SEARCH ENGINE

BACKGROUND

A. Field of the Invention

Implementations consistent with the principles of the invention relate generally to information retrieval and, more particularly, to improving results of search engines.

B. Description of Related Art

Online users frequently download software, either intentionally or unintentionally, from online sources, such as but not limited to websites, peer to peer sites/networks, or instant messaging networks. Typically, the software performs functions desired by the user. Sometimes, however, the software may be "scumware" that was designed to do damage to a user's computer, monitor a user's actions, display unwanted advertising or popups, or perform other unwanted or undesirable actions on the user's computer system.

Web sites that include or are otherwise associated with scumware are to be avoided.

SUMMARY

One aspect is directed to a method for responding to a search query. The method includes receiving the search query and comparing the received search query to a document index, the document index including indications of which documents in the document index are associated with scumware. The method further includes responding to the search query with search results determined based on a comparison of the search query to the document index and based on the indications of which of the documents in the document index are associated with scumware.

Another aspect is directed to a method that includes receiving a search query from a user and generating search results for the search query to obtain documents that are relevant to the search query. The method further includes formatting the search results as a web page that includes a list of documents relevant to the search query, the web page including visual indicators associated with those of the relevant documents that have been determined to be associated with scumware. The method further includes transmitting the web page to the user.

Yet another aspect is directed to a system including logic to store information labeling web documents as whether the web documents are associated with scumware. The system further includes logic to respond to requests from a toolbar executing on a client computer and in communication with the logic to store information. The requests relate to whether a web site being browsed by a user of the client computer is associated with scumware. The toolbar informs the user of the client computer when the logic to store information indicates, in response to the request, that the web site is associated with scumware.

BRIEF DESCRIPTION OF THE DRAWINGS

The accompanying drawings, which are incorporated in and constitute a part of this specification, illustrate one or more embodiments of the invention and, together with the description, explain the invention. In the drawings.

DETAILED DESCRIPTION

The following detailed description of the invention refers to the accompanying drawings. The detailed description does not limit the invention.

Overview

Implementations consistent with the principles of the invention relate to a search engine that takes the presence of scumware into account when providing search results to users. The search engine may, for example, exclude sites associated with scumware from search results or in someway flag these sites so that the user is aware that the site may be a potentially dangerous site before the user navigates to the site.

Figure 1:
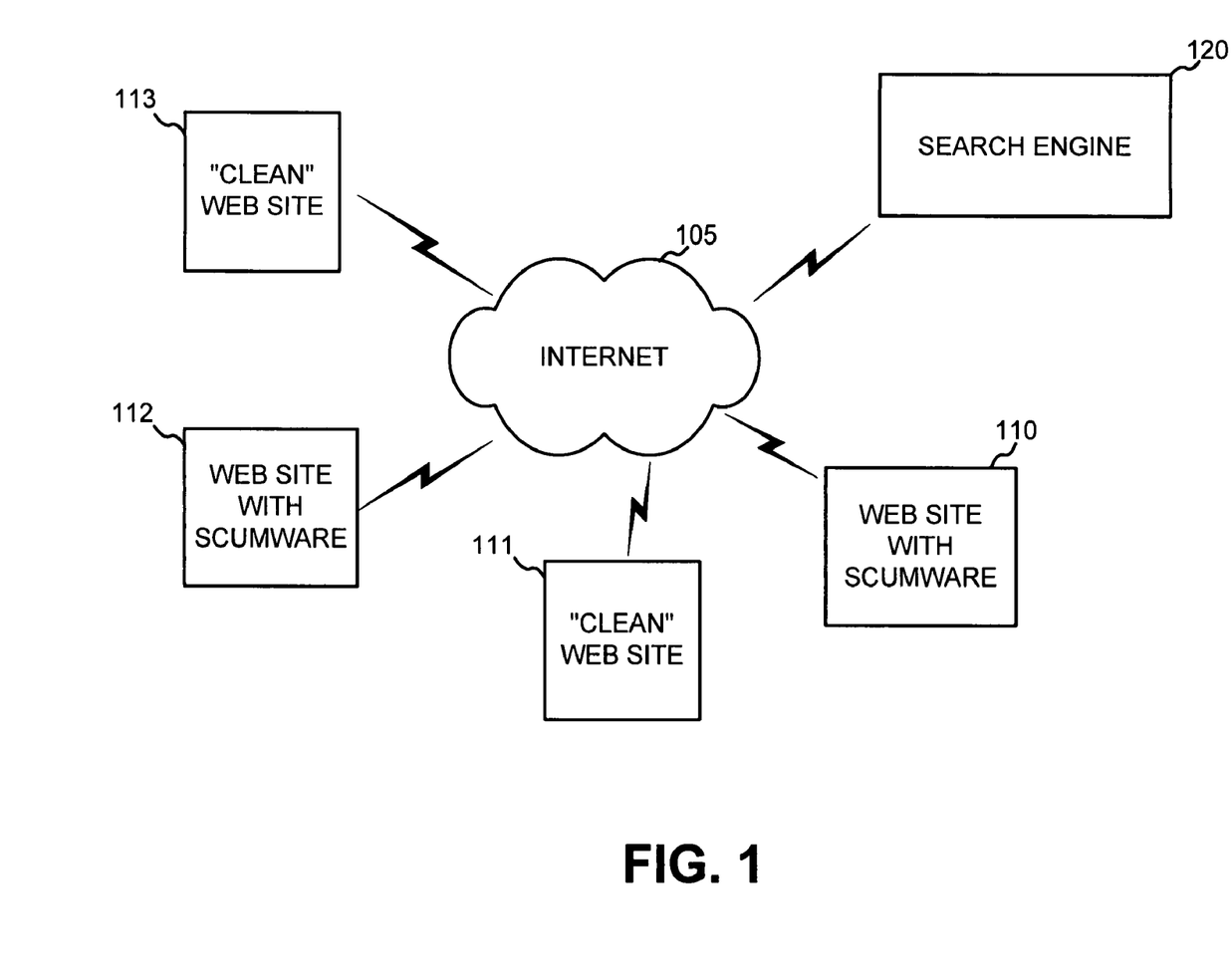
FIG. 1 is a diagram conceptually illustrating, at high level, an exemplary implementation consistent with aspects of the invention.

FIG. 1 is a diagram conceptually illustrating, at a high level, an exemplary implementation consistent with aspects of the invention. Consider a network 105, such as the Internet, that connects users to web sites. A number of different web sites 110 through 113 are shown. Some of the web sites, web sites 111 and 113, are "normal" web sites that do not contain any scumware that is available to be downloaded. Others of the web sites, such as web sites 110 and 112, are web sites associated with scumware. Most users would prefer to avoid scumware web sites 110 and 112.

Search engine 120 may generally operate to crawl and index web sites 110-113. Users (not shown) connected to network 110 may transmit search terms (called a search query herein) that relate to a topic in which they are interested to search engine 120. Search engine 120 may respond by returning a list of documents, or links to documents, that are relevant to the search query.

Consistent with an aspect of the invention, search engine 120 may determine which of sites 110-113 are associated with scumware and take this information into account when returning search results. Search engine 120 may, for example, exclude scumware sites 110 and 112 from the search results, regardless of how relevant sites 110 and 112 otherwise are to the search query. Alternatively, search engine 120 may, for example, demote scumware sites 110 and 112 in the ranking of sites returned in the search results and/or visually flag scumware sites 110 and 112 when these sites are returned to a user.

System Description

Figure 2:
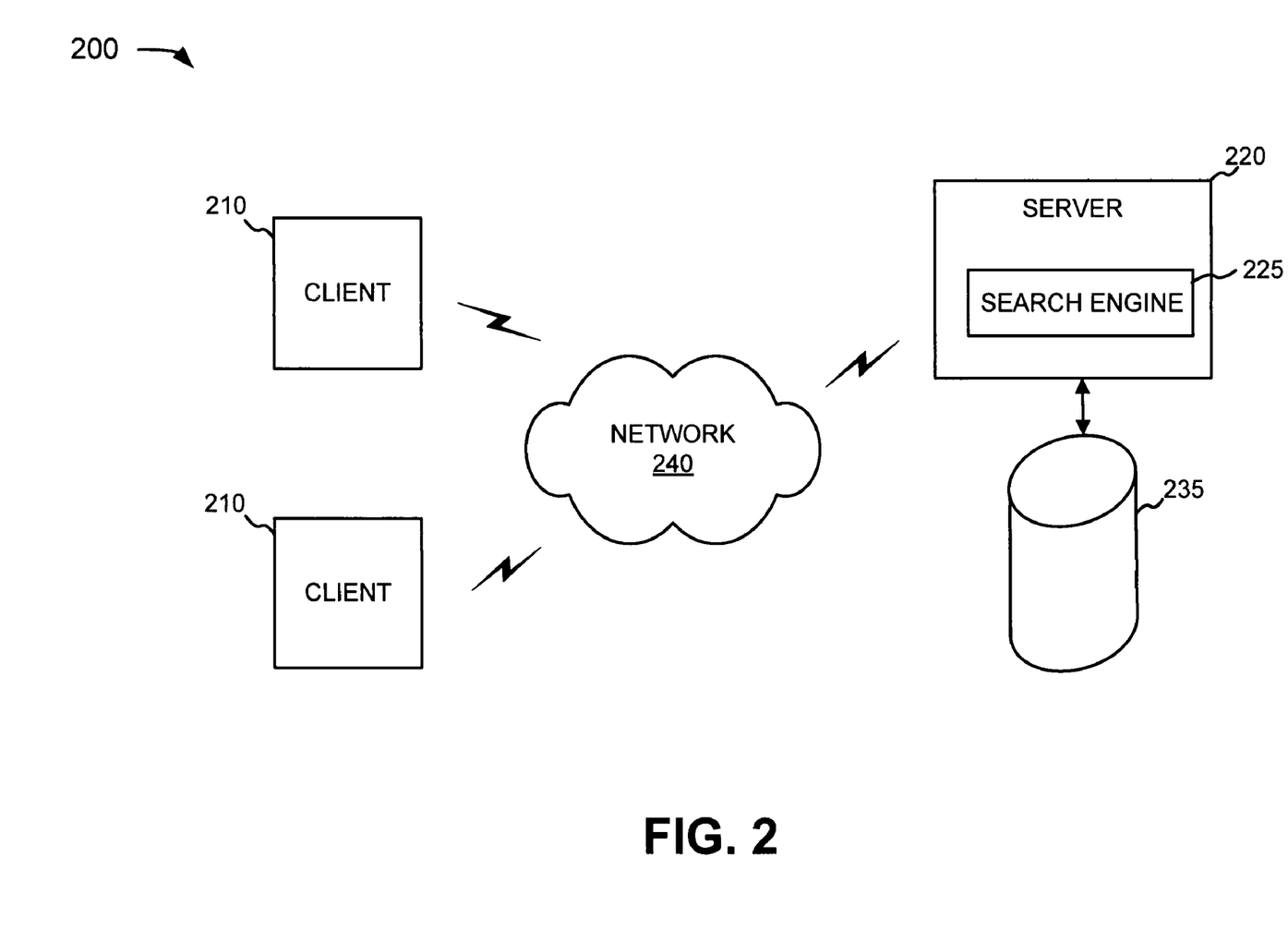
FIG. 2 is an exemplary diagram of a network.

FIG. 2 is an exemplary diagram of a network 200 in which systems and methods consistent with the principles of the invention may be implemented. Network 200 may include clients 210 connected to a server 220 via a network 240. Network 240 may include a local area network (LAN), a wide area network (WAN), a telephone network, such as the Public Switched Telephone Network (PSTN), an intranet, the Internet, or a combination of networks. Two clients 210 and one server 220 have been illustrated as connected to network 240 for simplicity. In practice, there may be more clients and/or servers. Also, in some instances, a client may perform the functions of a server and a server may perform the functions of a client.

A client 210 may include a device, such as a wireless telephone, a personal computer, a personal digital assistant (PDA), a lap top, or another type of computation or communication device, a thread or process running on one of these devices, and/or an object executable by one of these devices. Server 220 may include a server device that processes, searches, and/or maintains documents. Clients 210 and server 220 may connect to network 240 via wired, wireless, or optical connections.

Server 220 may include a search engine 225 usable by clients 210. Search engine 225 may be a query-based document search engine. Search engine 225 may be designed to return links to web pages that include information relevant to a search query. Search engine 225 may be a general web search engine, or in alternate implementations, may be a more specialized search engine, such as a shopping search engine or a local search engine.

Search engine 225 may respond to user search queries based on documents stored in database 235. The documents stored in database 235 may include web pages that are connected to network 240 and that were previously crawled and indexed by search engine 225. Database 235 may also include an indication of whether the indexed documents include or are associated with scumware. Although shown as a single database in FIG. 2, database 235 could be distributed over multiple storage devices.

A document, as the term is used herein, is to be broadly interpreted to include any machine-readable and machine-storable work product. A document may be an e-mail, a business listing, a web site, a web page, a file, a combination of files, one or more files with embedded links to other files, a news group posting, a blog, a web advertisement, etc. In the context of the Internet, a common document is a web page. Documents often include textual information and may include embedded information (such as metainformation, images, hyperlinks, etc.) and/or embedded instructions (such as Javascript, etc.). A "link," as the term is used herein, is to be broadly interpreted to include any reference to/from a document from/to another document or another part of the same document. Throughout this disclosure, the terms document, web page, and web site will be used interchangeably in the context of including or being associated with scumware.

Exemplary Client/Server Architecture

Figure 3:
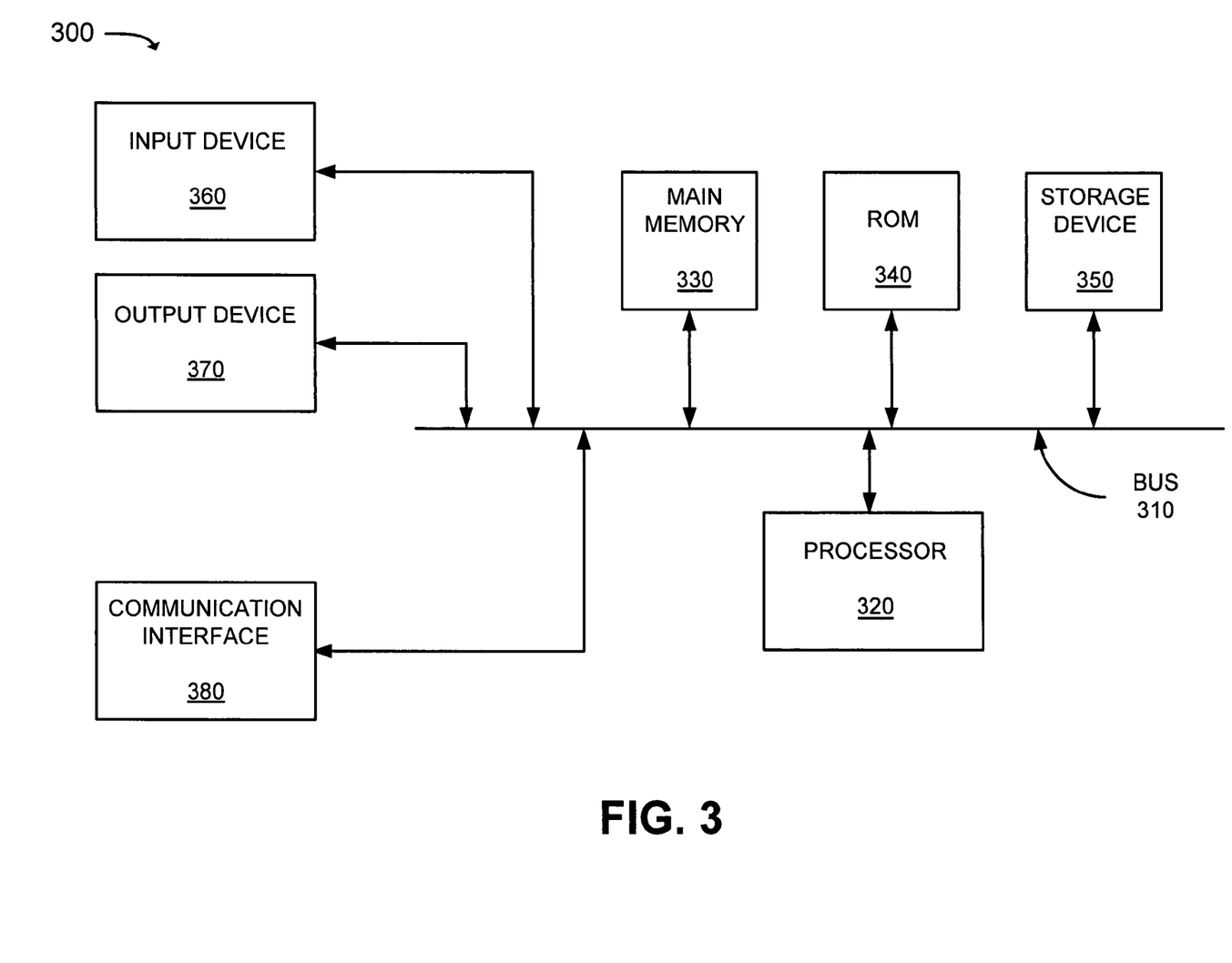
FIG. 3 is an exemplary diagram of a client or server.

FIG. 3 is an exemplary diagram of a client 210 or server 220, referred to as computing device 300, according to an implementation consistent with the principles of the invention. Computing device 300 may include a bus 310, a processor 320, a main memory 330, a read only memory (ROM) 340, a storage device 350, an input device 360, an output device 370, and a communication interface 380. Bus 310 may include a path that permits communication among the components of computing device 300.

Processor 320 may include any type of processor, microprocessor, or processing logic that may interpret and execute instructions. Main memory 330 may include a random access memory (RAM) or another type of dynamic storage device that stores information and instructions for execution by processor 320. ROM 340 may include a conventional ROM device or another type of static storage device that stores static information and instructions for use by processor 320. Storage device 350 may include a magnetic and/or optical recording medium and its corresponding drive.

Input device 360 may include a conventional mechanism that permits a user to input information to computing device 300, such as a keyboard, a mouse, a pen, voice recognition and/or biometric mechanisms, etc. Output device 370 may include a conventional mechanism that outputs information to the user, including a display, a printer, a speaker, etc. Communication interface 380 may include any transceiver-like mechanism that enables computing device 300 to communicate with other devices and/or systems. For example, communication interface 380 may include mechanisms for communicating with another device or system via a network, such as network 240.

Search engine 225 may be stored in a computer-readable medium, such as memory 330. A computer-readable medium may be defined as one or more physical or logical memory devices and/or carrier waves. The software instructions defining search engine 225 may be read into memory 330 from another computer-readable medium, such as data storage device 350, or from another device via communication interface 380. The software instructions contained in memory 330 cause processor 320 to perform processes that will be described later. Alternatively, hardwired circuitry may be used in place of or in combination with software instructions to implement processes consistent with the present invention. Thus, implementations consistent with the principles of the invention are not limited to any specific combination of hardware circuitry and software.

Operation of Search Engine 225

Figure 4:
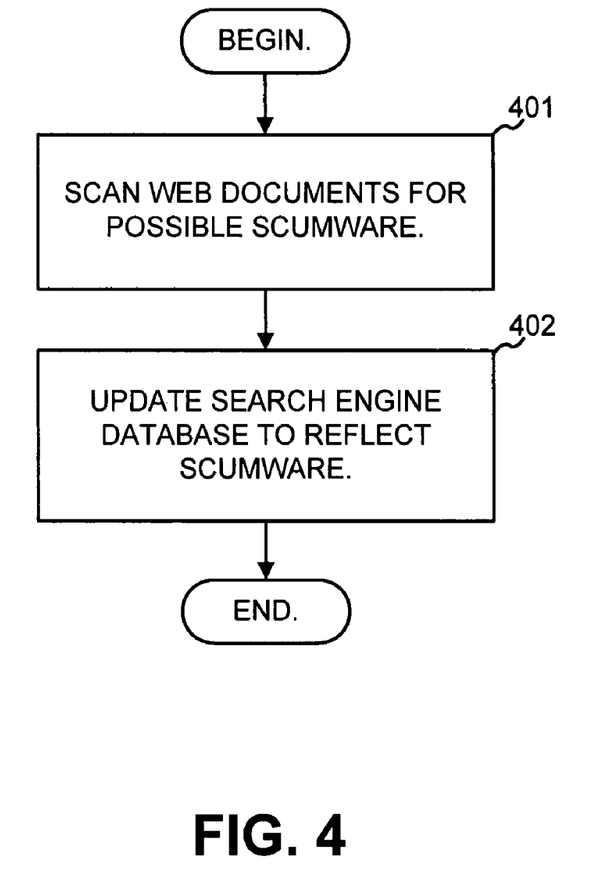
FIG. 4 is a flow chart illustrating exemplary operations of the search engine shown in FIG. 2 in updating the database shown in FIG. 2.

FIG. 4 is a flow chart illustrating exemplary operations of search engine 225 relating to updating database 235. Database 235 may store an index, such as an inverted index, of documents available from network 240.

Search engine 225 may scan web documents for possible scumware (act 401).

Scumware, as this term is used herein, broadly refers to any program designed to damage or do other unwanted actions on a computer system. Common examples of scumware include viruses, worms, trojan horses, spyware, adware, and malware. When determining whether to classify software as scumware, a number of factors may be considered. Exemplary factors that tend to indicate scumware include whether the software: changes browser settings such as the default search provider or home page without user permission; changes machine configuration in any way that affects security without user permission; creates or modifies 'hosts' files to divert domain references; displays popup/popunder advertisements when program is not running or displays the advertisements in a way that do not appear to be connected to the program; displays popup/popunder advertisements that cannot be closed by clicking a "close" (e.g., red X) button in the upper right of the window; modifies the layered service provider (LSP) stack by inserting additional referenced code without user permission; installs itself even when the user selects "no" in response to question asking to install; installs without notifying user; cannot be uninstalled through normal operating system uninstall procedure or provides no separate uninstall option; includes mechanisms to thwart removal by anti-spyware removal tools; defends against removal or change in its registry entries; monitors the registry and rewrites its settings as the user deletes them; includes an uninstaller that is actually a silent re-installer; uninstaller leaves components running after reboot; silently connects to an unintended site (with or without redirecting the address request) to transmit usage or other information to that site without user permission; dials toll numbers without user permission or awareness; silently uninstalls or updates itself without user awareness; silently modifies or substitutes information that is to be displayed to the user, such as search results or advertisements; or silently tracks keystrokes or gathers user identification information (e.g., login names, passwords, address, etc) without user permission.

The scanning performed in act 401 to detect scumware may be performed using a number of different techniques. Scumware detection utilities, such as spyware detection programs, are known in the art. Scumware may generally be detected by, for instance, matching names of files stored at web sites to lists of known scumware files and/or matching file properties (e.g., file size, date, publisher) with known scumware files. Other scumware detection techniques may be based on file signatures, such as pattern matching portions of files to known scumware signatures, or based on heuristic detection techniques. Yet other scumware detection techniques scan the system registry to look for registry modifications that match those made by known scumware. In addition, methods of scumware distribution can be detected using similar techniques on numerous types of documents. For example, detecting that a webpage is exploiting a browser security loophole can be accomplished by checking script code in the webpage against known code snippets. Scumware detection techniques and programs are known in the art and will thus not be described in additional detail.

When scanning a web page, scumware may be identified based on using one or more of the techniques described above. In some situations, not all of the techniques may be applicable. For example, when simply scanning the contents of a page (including files available for download at the page) by search engine 225, registry scanning may not be an applicable technique. In some, implementations, however, instead of simply scanning a page by examining the contents of a page, the page may be visited as an end user would visit the page (e.g., by emulating a browser with typical configurations) and installing programs from the site. In this situation, registry scanning may also be an applicable technique for locating scumware. In general, when a site or document is said to be associated with scumware, the scumware may be directly incorporated into the site (such as in the HTML code or script of the site), may be downloaded from the site (such as by downloading an executable file from the site), or may be included at another site linked-to by the site.

In one implementation, the scanning performed in act 401 may be done as search engine 225 crawls the web pages (i.e., at crawl time, prior to indexing). In other implementations, the scanning may be performed separately from crawling, such as after the web page is in the index, or may be performed on versions of web pages that were previously stored by search engine 225. In yet another possible implementation, the scanning may be performed when a web page is requested (lazy evaluation). In still other implementations, the scanning may be performed by a third party or another process and search engine 225 may import the results.

Sites that include scumware, as identified in act 401, may be noted in database 235 (act 402). For example, the document index may include an indication for sites that contain scumware. In some implementations, the indication of whether a site contains scumware may be a value that corresponds to a level of severity of scumware at the site, a value that corresponds to a level of confidence by the search engine that the site includes scumware, or a value indicating the type of scumware present at the site.

Figure 5:
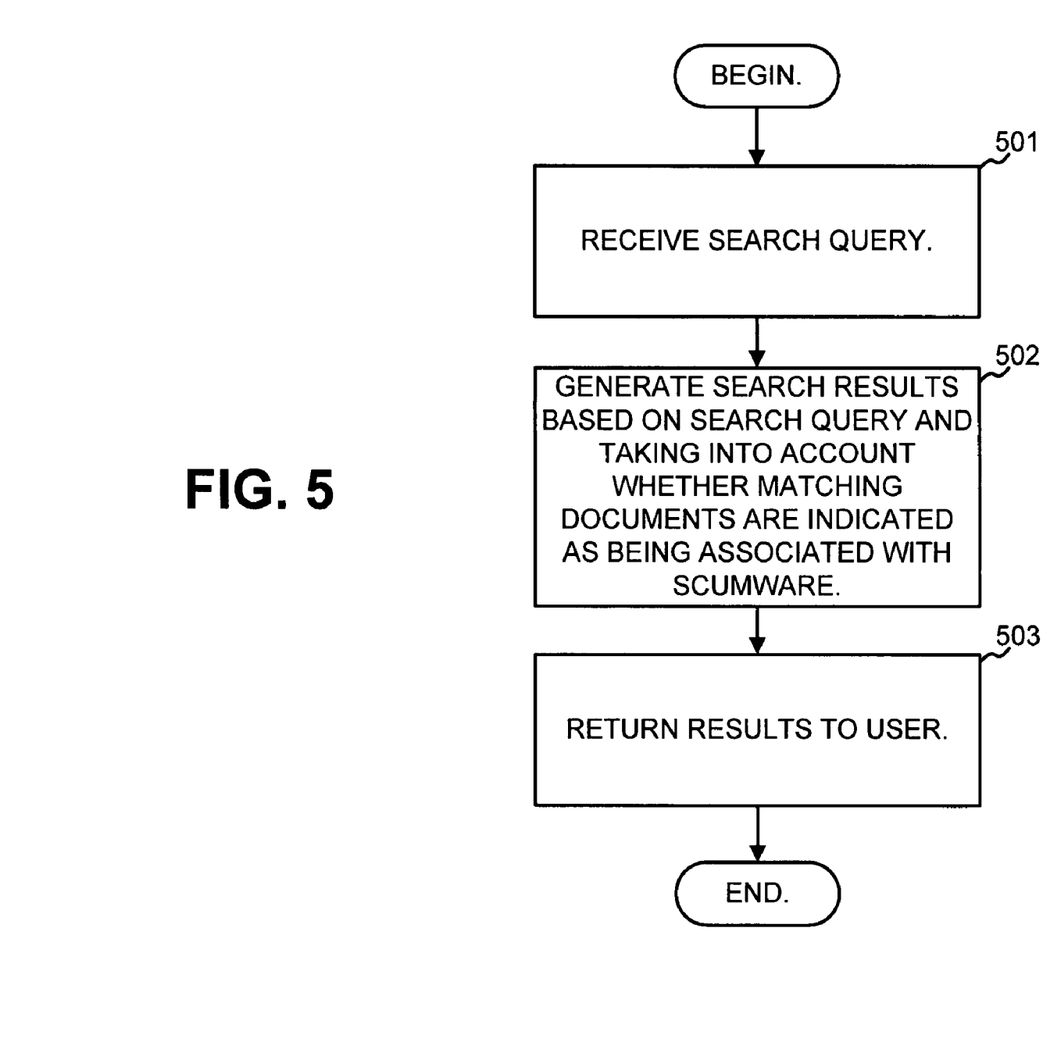
FIG. 5 is a flow chart illustrating exemplary operations of the search engine in returning search results to a user.

In operation, search engine 225 may receive search queries and respond by transmitting relevant documents or links to relevant documents to users. FIG. 5 is a flow chart illustrating exemplary operations of search engine 225 in returning search results to a user.

Search engine 225 may receive a search query (act 501). Based on the search query, search results, such as list of links to documents relevant to the search query, may be generated (act 502). The search results may be generally obtained by matching the terms in the search query to documents in database 235 that contain the terms. The results may take into account whether the matching web pages are associated with scumware (act 502). In one implementation, web pages that were determined to include scumware (FIG. 4) may be excluded from the results. In another implementation, the web pages that were determined to include scumware may be demoted or deemphasized when ranking the list of returned results. The results of the search query may then be returned to the user (act 503).

Figure 6:
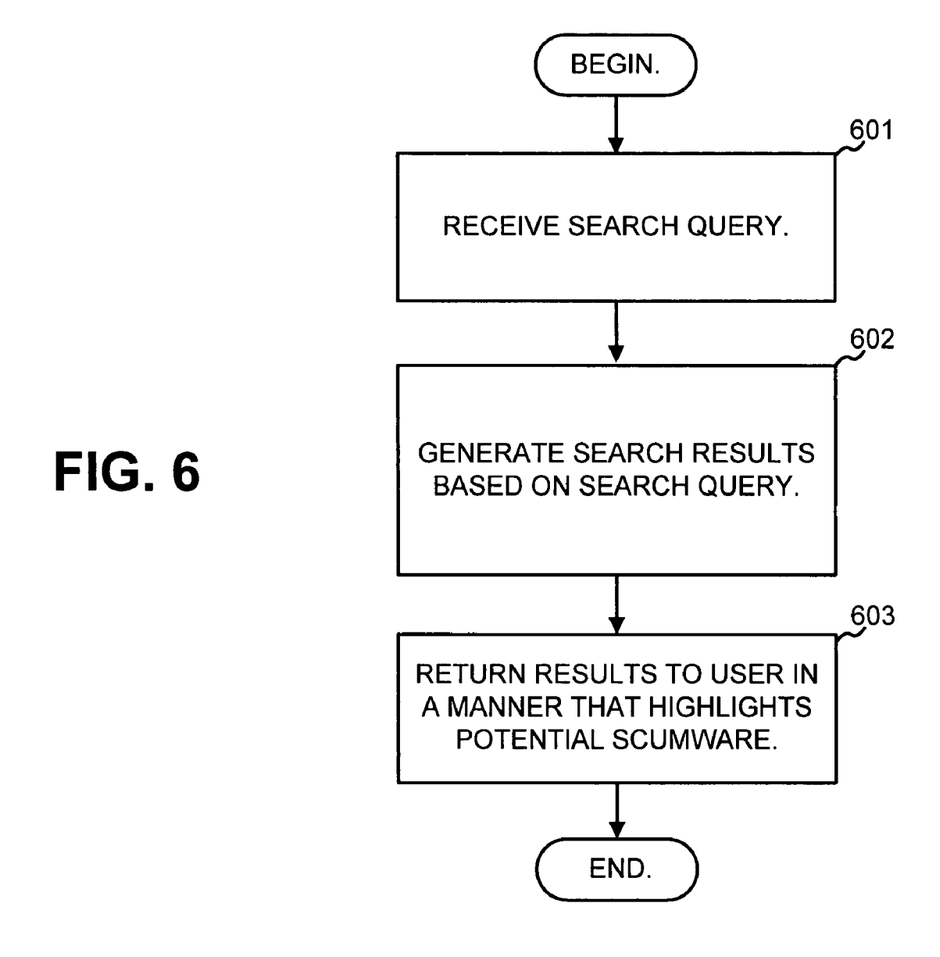
FIG. 6 is a flow chart illustrating exemplary operations of the search engine in returning search results to a user consistent with another aspect of the invention.

FIG. 6 is a flow chart illustrating exemplary operations of search engine 225 in returning search results to a user consistent with another aspect of the invention. Search engine 225 may receive a search query (act 601). Based on the search query, search results, such as list of links to documents relevant to the search query, may be generated (act 602). The search results may be generally obtained by matching the terms in the search query to documents in database 235 that contain the terms. The search results may be returned to the user in a manner that highlights or otherwise informs the user of documents that were determined to be associated with scumware (act 603). The potential scumware documents (e.g., web pages or web sites) may be conveyed to the user in a number of ways. For example, potential scumware sites may be shown to the user by displaying a pre-determined icon next to the search result link or by displaying the search result link in a different font or color.

In the exemplary implementation of FIG. 5, whether a document corresponds to a scumware site is taken into account when ranking or determining whether a document matches a search query. In the exemplary implementation of FIG. 6, whether a document corresponds to a scumware site is displayed or otherwise presented to the user as part of the search result document. It can be appreciated that in some implementations, combinations of these two techniques could be used at the same time. Further, the user may be given the option to select how the user would like search engine 225 to handle possible scumware sites, such as an option to be given a visual indicator of scumware sites or to remove scumware sites from search results.

Figure 7:
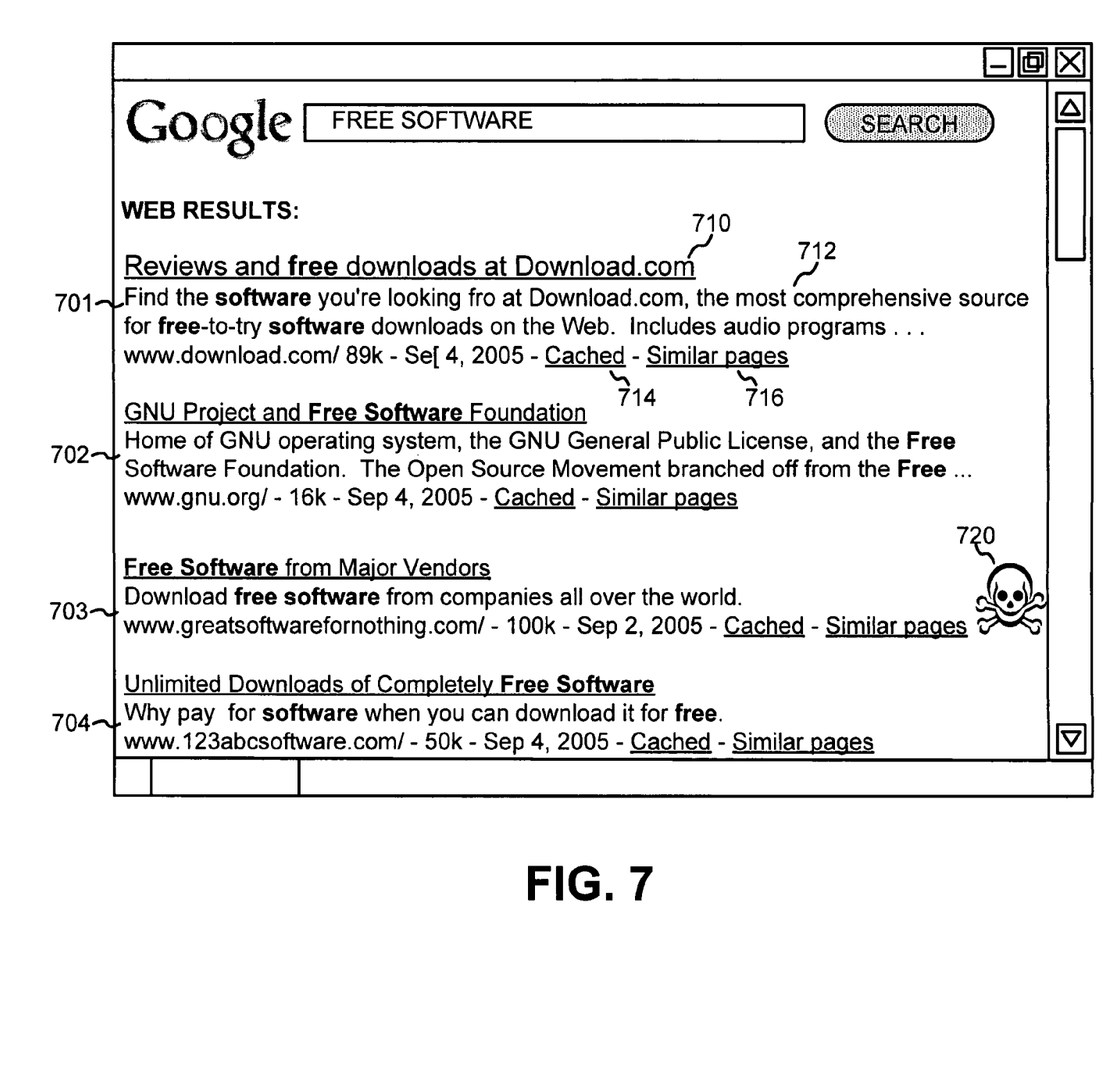
FIGS. 7-9 are diagrams illustrating exemplary graphical interfaces used with search results.

FIG. 7 is a diagram illustrating exemplary search results for a search generated consistent with an implementation of the acts shown in FIG. 6. In this example, the search query "free software" was submitted. For this search query, four results 701-704 are shown. Each result, such as result 701, may include a link 710 to the relevant document; a snippet of text 712 describing the contents of the document; a link 714 to a "cached" version of the document, which is a copy of the document stored by search engine 225/database 235; and a link 716 to a list of documents similar to document 701. Additionally, assume result 703 is a document that was determined to be associated with scumware. In this implementation, result 703 is marked with an icon 720 that visually indicates to the user that the web page corresponding to result 703 may include or be associated with scumware.

Figure 8:
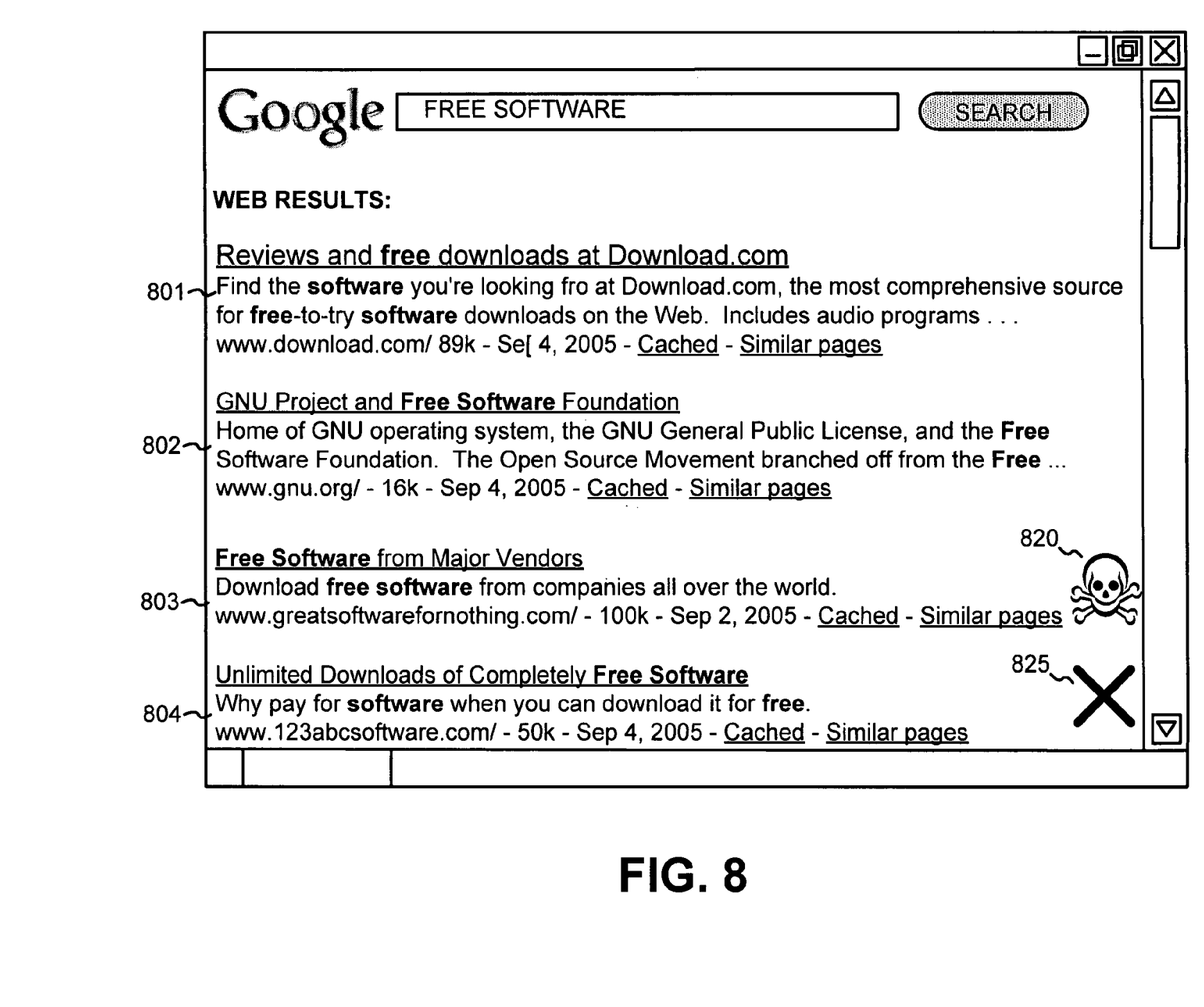

FIG. 8 is a diagram illustrating exemplary search results for a search generated consistent with another implementation of the acts shown in FIG. 6. As in the example of FIG. 7, assume that the search query "free software" was submitted and four results 801-804 are shown. Additionally, assume result 803 is a document that was previously determined to include scumware that can be downloaded. Assume result 804 refers to a web site that does not directly include scumware but that includes one or more links that lead to sites that include scumware. Results 803 and 804 may be marked with different icons indicating their differing levels of scumware severity. As shown, result 803 is marked with a first scumware icon 820 and result 804 is marked with a second scumware icon 825.

Figure 9:
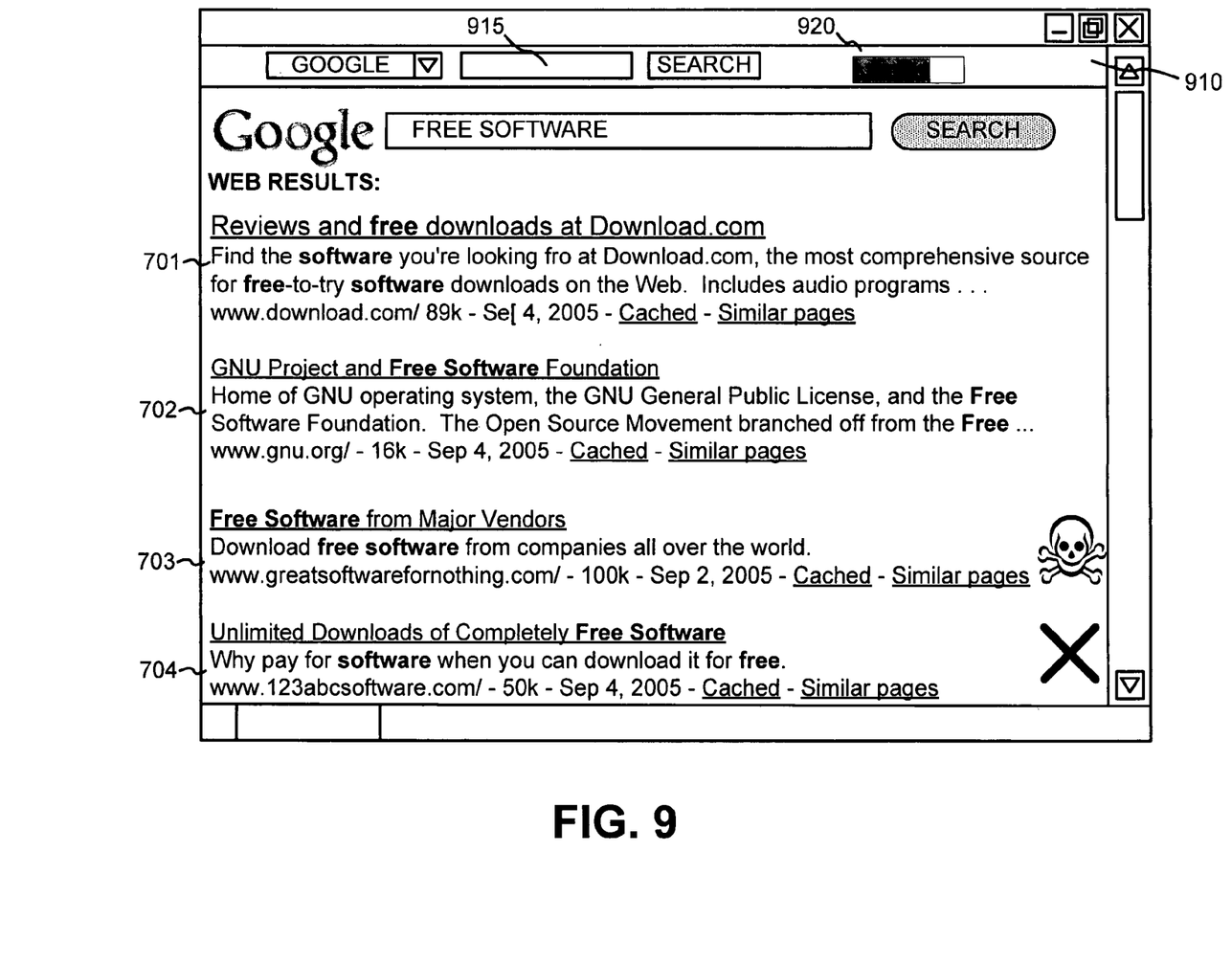

FIG. 9 is a diagram illustrating exemplary search results for a search generated consistent with another implementation of the acts shown in FIG. 5 or 6. In this example, assume that the user has installed a browser toolbar 910 that executes at a client 210 and may integrate itself with a browser program run by client 210. Toolbar 910 may include one or more search boxes, software buttons, and/or menu elements selectable by a user to initiate different functions by toolbar 910. In this case, a user may activate a function of toolbar 910 by entering information into a search box 915 and/or selecting one of the software buttons and/or menu elements. Toolbar 910 may include, for example, a security threat warning indicator 920 that may visibly change when the user visits a site associated with scumware. A value to display for security threat warning 920 may be obtained by toolbar 910 from search engine 225. In one implementation, the intensity of the visual warning display by toolbar 915 may vary based on the confidence of the site being scumware or based on a level of harmfulness, severity, or type of the scumware. Toolbar 910 can include other indicators (not shown), such as, for example: the number of links on the web site or web page that lead to scumware or the shortest number of links from the current site to a scumware site.

In some implementations, search engine 225 may store (cache) copies of web documents. Users may view the cached versions of the web documents by clicking on the "cached" links, such as link 714, associated with the search results. Search engine 225 may clean scumware from any cached documents and thus be able to guarantee to its users that its cached results are scumware free, even when the original document is associated with scumware.

Implementation of the Search Engine in the Context of Local Search

The search engine described above was has primarily described as a search engine that indexes web sites on a network (e.g., the Internet) and returns search results to users via the network. In alternate implementations, however, the search engine may be implemented as a local search engine that executes on and returns search results based on documents stored at the local computer.

Figure 10:
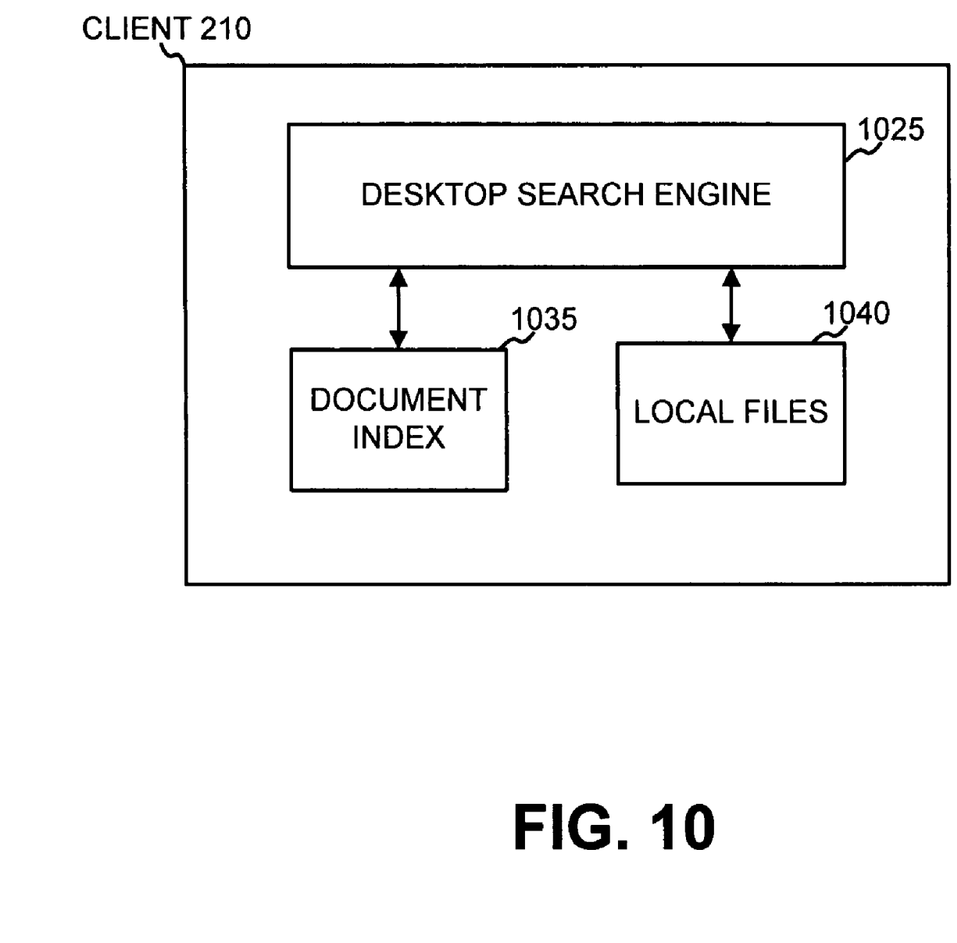
FIG. 10 is a diagram illustrating an implementation of a local ("desktop") search engine.

FIG. 10 is a diagram illustrating an implementation of a local ("desktop") search engine. Desktop search engine 1025 may be an application executing on a client 210. Desktop search engine 1025 may generally operate to scan and index local files 1040 on client 210. Desktop search engine 1025 may maintain a document index 1035 corresponding to the scanned local files 1040.

In operation, when scanning local files 1040, desktop search engine 1025 may detect files that correspond to scumware, such as a downloaded virus, adware application, or trojan. Desktop search engine 1025 may inform the user of client 210 of the scumware, such as by immediately informing the user of the presence of the scumware or by informing the user of the presence of the scumware in conjunction with search results relating to the scumware.

CONCLUSION

Search engine 225, as described above, may protect users from scumware included on or associated with web sites indexed by the search engine. The search engine may, for instance, take the presence of scumware into account when ranking or determining whether a document matches a search query. Alternatively or additionally, the search engine may display or otherwise indicate to when a search result is likely to include or be associated with scumware.

The foregoing description of exemplary embodiments of the invention provides illustration and description, but are not intended to be exhaustive or to limit the invention to the precise form disclosed. Modifications and variations are possible in light of the above teachings or may be acquired from practice of the invention.

For example, while a series of acts have been described with regard to FIGS. 4-6, the order of the acts may be varied in other implementations consistent with the invention. Moreover, non-dependent acts may be implemented in parallel.

It will also be apparent to one of ordinary skill in the art that aspects of the invention, as described above, may be implemented in many different forms of software, firmware, and hardware in the implementations illustrated in the figures. The actual software code or specialized control hardware used to implement aspects consistent with the principles of the invention is not limiting of the invention. Thus, the operation and behavior of the aspects of the invention were described without reference to the specific software code—it being understood that one of ordinary skill in the art would be able to design software and control hardware to implement the aspects based on the description herein.

Further, certain portions of the invention may be implemented as "logic" or as a "component" that performs one or more functions. This logic or component may include hardware, such as an application specific integrated circuit or a field programmable gate array, software, or a combination of hardware and software.

No element, act, or instruction used in the description of the invention should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method performed by a computer system, the method comprising:
 identifying, by the computer system, two or more documents;
 determining that a first identified document, of the two or more documents, includes one or more links that lead to scumware;
 determining that a second identified document, of the two or more documents, includes scumware;
 storing, by the computer system, and in a document index that relates search query terms to documents, first data indicating that the first identified document includes one or more links that lead to scumware;
 storing, by the computer system and in the document index, second data indicating that the second identified document includes scumware;

providing, by the computer system and for display, a link to the first identified document, a link to the second identified document, a first indication that is based on the first data and indicates that the first identified document includes one or more links that lead to scumware, and a second indication that is based on the second data and indicates that the second identified document includes scumware, where the first indication is different than the second indication;

receiving, by the computer system, a request from a toolbar, associated with a client device, for scumware-related information associated with the first identified document; and providing, by the computer system and in response to receiving the request, the first data, where the toolbar displays, based on the first data, a visual indicator of a shortest number of links from the first identified document to another document associated with scumware, where the number is more than one.

2. The method of claim 1, where the scumware includes at least one of a computer virus, a Trojan horse program, a computer worm, adware or spyware.

3. The method of claim 1, where the scumware includes software that:
changes browser settings without permission;
changes a security configuration;
diverts domain references;
displays popup advertisements;
modifies a layered service stack without user permission;
installs a program without user permission;
cannot be uninstalled through a normal uninstall procedure;
thwarts removal by anti-spyware tools;
defends against removal or change in registry entries;
transmits information to a site without user permission; or
tracks keystrokes or gathers user information without user permission.

4. The method of claim 1, where identifying the two or more documents includes one or more of:
matching an attribute of a file associated with at least one of the first identified document or the second identified document with corresponding attributes of files designated as including scumware;
matching a file signature of the file associated with at least one of the first identified document or the second identified document with file signatures of the files designated as including scumware;
detecting that at least one of the first identified document or the second identified document is associated with a registry modification; or
detecting that script associated with at least one of the first identified document or the second identified document includes script code to exploit a browser security loophole.

5. The method of claim 1, where identifying the two or more documents includes:
matching an attribute of a file associated with the first identified document or the second identified document with corresponding attributes of files designated as including scumware, and where the attribute of the file includes one or more of a name of the file, a size of the file, a date associated with the file, or a publisher associated with the file.

6. A system comprising:
a processor; and
a memory coupled to the processor, the memory comprising:

logic to identify two or more documents;
logic to determine that a first identified document, of the two or more documents, includes one or more links that lead to scumware;
logic to determine that a second identified document, of the two or more documents, includes scumware;
logic to store first data indicating that the first identified document includes one or more links that lead to scumware;
logic to store second data indicating that the second identified document includes scumware;
logic to provide, for display, a link to the first identified document, a link to the second identified document, a first indication that is based on the first data and indicates that the first identified document includes one or more links that lead to scumware, and a second indication that is based on the second data and indicates that the second identified document includes scumware, where the first indication is different than the second indication;
logic to respond to one or more requests from a toolbar executing on a client computer and in communication with the logic to store the first data and the logic to store the second data, the one or more requests relating to whether the first identified document, being accessed by a user of the client computer, is associated with scumware; and
logic to provide, to the client computer, the first data, where the toolbar displays, based on the first data, the shortest number of links from the first identified document to another document associated with scumware, where the number is more than one.

7. The system of claim 6, where the scumware includes at least one of a computer virus, a Trojan horse program, a computer worm, adware or spyware.

8. The system of claim 6, where the scumware includes software that:
changes browser settings without permission;
changes a security configuration;
diverts domain references;
displays popup advertisements;
modifies a layered service stack without user permission;
installs a program without user permission;
cannot be uninstalled through a normal uninstall procedure;
thwarts removal by anti-spyware tools;
defends against removal or change in registry entries;
transmits information to a site without user permission; or
tracks keystrokes or gathers user information without user permission.

9. A device comprising:
a memory storing instructions; and
a processor that executes the instructions to:
identify two or more documents;
determine that a first identified document, of the two or more documents, includes one or more links that lead to scumware;
determine that a second identified document, of the two or more documents, includes scumware;
store first data indicating that the first identified document includes one or more links that lead to scumware;
store second data indicating that the second identified document includes scumware;
provide, for display, a link to the first identified document, a link to the second identified document, a first indication that is based on the first data and indicates that the first identified document includes one or more links that lead to scumware, and a second indication that is based on the second data and indicates that the second identified document includes scumware, where the first indication is different than the second indication;

receive a request from a toolbar executing on a client computer, the request relating to whether the first identified document, being accessed by a user of the client computer, is associated with scumware; and provide, to the client computer and in response to the request, the first data, where the first data indicates a shortest number of links from the first identified document to another document associated with scumware, where the number is more than one, and where the shortest number of links is displayed in a visual indicator in the toolbar.

10. A system comprising:

one or more physical devices comprising:
means for identifying two or more documents;
means for determining that a first identified document, of the two or more documents, includes one or more links that lead to scumware;
means for determining that a second identified document, of the two or more documents, includes scumware;
means for storing, in a document index that relates search query terms to documents, first data indicating that the first identified document includes one or more links that lead to scumware;
means for storing, in the document index, second data indicating that the second identified document includes scumware;
means for providing, for display, a link to the first identified document, a link to the second identified document, a first indication that is based on the first data and indicates that the first identified document includes one or more links that lead to scumware, and a second indication that is based on the second data and indicates that the second identified document includes scumware, where the first indication is different than the second indication;
means for receiving a request from a toolbar, executing on a client computer, for scumware-related information associated with the first identified document, being accessed by a user of the client computer; and
means for providing, to the client computer and in response to the request, the first data, where the first data indicates a shortest number of links from the first identified document to another document associated with scumware, where the number is more than one, and where the shortest number of links is displayed in a visual indicator in the toolbar.

11. The system of claim 10, where the one or more physical devices further comprise:
means for cleaning scumware from at least one of the first identified document or the second identified document;
means for caching at least one of the cleaned first identified document or the cleaned second identified document;
means for receiving a search query;
means for generating a web page that includes a list of documents relevant to the search query; and
means for including, in the web page, links to at least one of the cached cleaned first identified document or the cached cleaned second identified document.

12. A non-transitory computer-readable medium comprising:
one or more instructions which, when executed by at least one processor, cause the at least one processor to identify two or more documents;
one or more instructions which, when executed by the at least one processor, cause the at least one processor to determine that a first identified document, of the two or more documents, includes one or more links that lead to scumware;
one or more instructions which, when executed by the at least one processor, cause the at least one processor to determine that a second identified document, of the two or more documents, includes scumware;
one or more instructions which, when executed by the at least one processor, cause the at least one processor to store, in an index that relates search query terms to documents, first data indicating that the first identified document includes one or more links that lead to scumware;
one or more instructions which, when executed by the at least one processor, cause the at least one processor to store, in the document index, second data indicating that the second identified document includes scumware;
one or more instructions which, when executed by the at least one processor, cause the at least one processor to provide, for display, a link to the first identified document, a link to the second identified document, a first indication that is based on the first data and indicates that the first identified document includes one or more links that lead to scumware, and a second indication that is based on the second data and indicates that the second identified document includes scumware, where the first indication is different than the second indication;
one or more instructions which, when executed by the at least one processor, cause the at least one processor to receive a request from a toolbar, executing on a client computer, for scumware-related information associated with the first identified document, being accessed by a user of the client computer; and
one or more instructions which, when executed by the at least one processor, cause the at least one processor to provide, to the client computer and in response to the request, the first data, where the first data indicates a shortest number of links from the first identified document to another document associated with scumware, where the number is more than one, and where the shortest number of links is displayed in a visual indicator in the toolbar.

13. The non-transitory computer-readable medium of claim 12, further comprising:
one or more instructions which, when executed by the at least one processor, cause the at least one processor to provide links to one or more cached versions of at least one of the first identified document or the second identified document, where the one or more cached versions are free of scumware.

14. A method performed by a computer system, the method comprising:
determining that a first document includes one or more links that lead to scumware;
determining that a second document includes scumware;
storing, in a storage device associated with the computer system, first data indicating that the first document includes one or more links that lead to scumware;
storing, in the storage device, second data indicating that the second document includes scumware;
providing, by a processor of the computer system and for display at a client device, a link to the first document, a link to the second document, a first indication that is based on the first data and indicates that the first document includes one or more links that lead to scumware, a second indication that is based on the second data and indicates that the second document includes scumware, where the first indication is different than the second indication, and a browser toolbar, where the browser toolbar includes one or more visual indicators that provide scumware-related information;

receiving, by a processor of the computer system, a request from the toolbar for scumware-related information associated with the first document when the client device accesses the first document; and providing, by a processor of the computer system and in response to receiving the request, the first data to the client device, where the toolbar displays, based on the first data, a visual indicator of a shortest number of links from the first document to another document associated with scumware, where the number is more than one.

15. The method of claim 14, where the one or more visual indicators include a visual indicator that varies based on a confidence that at least one of the first document or the second document is associated with scumware.

16. The method of claim 14, where the one or more visual indicators include a visual indicator that varies based on a level of harmfulness of scumware associated with at least one of the first document or the second document.

17. The method of claim 14, where the scumware-related information includes information relating to at least one of a virus, a worm, a Trojan horse, spyware, adware, or malware.

18. The method of claim 14, where the scumware-related information includes information relating to software that:
  changes browser settings without permission;
  changes a security configuration;
  diverts domain references;
  displays popup advertisements;
  modifies a layered service stack without user permission;
  installs a program without user permission;
  cannot be uninstalled through a normal uninstall procedure;
  thwarts removal by anti-spyware tools;
  defends against removal or change in registry entries;
  transmits information to a site without user permission; or
  tracks keystrokes or gathers user information without user permission.

* * * * *